United States Patent [19]

Vinciguerra

[11] Patent Number: 5,431,290
[45] Date of Patent: Jul. 11, 1995

[54] BABY BOTTLE FOR IMPROVED FLOW

[76] Inventor: Mark T. Vinciguerra, County Line Plaza #590, U.S. Hwy. 1, Tequesta, Fla. 33469

[21] Appl. No.: 277,504

[22] Filed: Jul. 19, 1994

Related U.S. Application Data

[63] Continuation of Ser. No. 53,550, Apr. 27, 1993, abandoned, which is a continuation of Ser. No. 856,504, Mar. 24, 1992, abandoned.

[51] Int. Cl.$^6$ ............................ A61J 9/04; A61J 11/02
[52] U.S. Cl. ...................................... 215/11.5; 215/260; 215/311; 222/481; 222/490; 137/845; 137/859
[58] Field of Search ...................... 215/11.5, 11.1, 260, 215/261, 262, 270, 311; 220/202, 203, 209; 137/845, 859; 222/481, 481.5, 490, 491, 494

[56] References Cited

U.S. PATENT DOCUMENTS

| | | | |
|---|---|---|---|
| 362,554 | 5/1887 | Suydam | 215/11.5 |
| 484,811 | 10/1892 | Newell | 215/11.5 |
| 1,037,309 | 9/1912 | Poore | 215/11.5 |
| 2,043,186 | 6/1936 | O'Dette | 215/11.5 |
| 2,084,099 | 6/1937 | Maccoy | 215/11.5 X |
| 2,094,721 | 10/1937 | Puetz | 215/11.5 |
| 2,394,722 | 2/1946 | Sloane | 215/11.5 |
| 2,644,663 | 7/1953 | Klingler | 137/845 X |
| 2,793,778 | 5/1957 | Maxwell | 215/11.1 |
| 3,134,495 | 5/1964 | Carbonel | 215/11.5 |
| 3,200,980 | 8/1965 | Jamell | 215/11.5 |
| 3,292,808 | 12/1966 | Greene | 215/11.5 |
| 3,355,047 | 11/1967 | De Sole | 215/11.1 |
| 3,556,122 | 1/1971 | Laerdal | 137/102 |
| 4,311,245 | 1/1982 | Maffei | 215/11.5 |
| 4,685,577 | 8/1987 | Chen | 215/11.5 |
| 4,750,647 | 6/1988 | Cohen | 137/859 X |
| 4,828,126 | 5/1989 | Vincinguerra | 215/11.5 |
| 4,865,207 | 9/1989 | Joyner et al. | 215/11.5 |
| 4,893,664 | 1/1990 | Oltean | 137/859 X |
| 4,991,745 | 2/1991 | Brown | 137/845 X |

FOREIGN PATENT DOCUMENTS

| | | | |
|---|---|---|---|
| 116872 | 6/1918 | United Kingdom | 215/11.5 |

*Primary Examiner*—Allan N. Shoap
*Assistant Examiner*—Vanessa Caretto
*Attorney, Agent, or Firm*—Malin, Haley, DiMaggio & Crosby

[57] ABSTRACT

A one-way air valve that is mounted removably at one end of a baby bottle housing having two threaded open ends, with the opposite end receiving a conventional nipple, the one-way air valve includes a central diverging passage defined by opposed converging side walls which has a tiny slit elongated along the apex portion of the converging side walls and an annular base sized for attachment to the open end of said baby bottle, the valve being concavely mounted into the bottle to avoid breakage and to prevent leakage of the contents, while preventing colic in the child.

6 Claims, 2 Drawing Sheets

BABY BOTTLE FOR IMPROVED FLOW

This application is a continuation of application Ser. No. 08/053,550, filed Apr. 17, 1993, now abandoned which is a continuation of application Ser. No. 07/856,504 filed on Mar. 24, 1992 now abandoned.

BACKGROUND OF THE INVENTION

1. Field of the Invention

This invention relates to an improved air valve for a baby bottle to prevent colic and, more particularly, to a baby bottle having a conventional nipple at one end and a one-way air valve mounted on the bottle opposite end to admit ambient air on demand for pressure equalization while preventing leakage of the bottle contents, the valve being removable to facilitate cleaning the bottle and valve.

2. Description of the Prior Art

Baby bottles with conventional nipples have a major disadvantage in that, as the baby sucks on the nipple, the nipple collapses due to reduced air pressure in the bottle. Thus, the infant must periodically release the hold on the nipple to permit air to re-enter the bottle through the nipple hole to equalize the internal and ambient air pressure.

It has been recognized that it is desirable to permit ambient air to enter the baby bottle from a valve mechanism for pressure equalization. Examples of such prior art are found in the following U.S. Pat. Nos.: 4,685,577; 2,669,234; 2,825,479; 3,768,683; 4,401,224; and 4,545,491. U.S. Pat. No. 4,685,577 issued to Chen has an air penetrating board with several air inlet apertures therethrough and a funnel shape discharge regulating element. It has two distinct disadvantages in that fluid in the discharge regulating element, under low pressure influence from suction force, is injected into the nipple portion of the assembly, aerating the fluid by mixing. Furthermore, symmetry in the cone shaped check valve due to the annular opening will not provide enough closure in the material and would, therefore, leak. In addition, the valves will contort and leak when the twisting force motion of the end cap is applied to the "O" ring portion of the air penetrating board.

Furthermore, U.S. Pat. No. 3,768,683 discloses a solid mushroom shaped valve with a seal thereon. It has a distinct disadvantage that it will not seat well and will wobble unless the tolerance is so close that the costs would be prohibitive.

Therefore, there exists a need for a baby bottle with an improved air intake valve configuration which provides constant air pressure equalization in the bottle without undesirable leakage.

SUMMARY OF THE INVENTION

An improved air intake valve used in conjunction with a nipple for a baby bottle to provide constant air pressure equalization inside and outside the bottle to prevent colic in the child using the bottle.

The baby bottle itself is comprised of a plastic or glass housing that is substantially hollow, cylindrical, and tubelike in shape and has a threaded open end at each end to receive screw-on fasteners (fixtures) that are used in conjunction both with the nipple, which is conventional, and with applicant's improved one-way air intake valve shaped as an inverted truncated cone with a flat apex with a slit air passage. It should be mentioned that the sizes of the openings utilized, both in the one-way air valve in accordance with the invention and the particular nipple, are essential to the operation of the device. In particular, using a standard nipple, the air intake valve opening, which is essentially a slot formed in a rubber or rubberlike material that is elongated, is sized to prevent milk or other contents from leaking out of the bottle, while at the same time ensuring a continuous and proper flow of air pressure equalization while the child is using the bottle, withdrawing liquid through the nipple.

The improved valve can be constructed from a molded piece of flexible impervious (water and milkproof) material, preferably latex rubber, that has a truncated apex having a top flat surface and a substantially rectangular opening very narrow in width between converging side walls, all of which is integrally formed or molded with an annular base that fits sealably over the bottle open end with a threaded fastener.

In operation, the valve in accordance with the present invention is inserted so that its convex portion is on the inside of the bottle container and the concave portion is on the outside of the container. Thus, with the present one-way valve installed across the bottom of the bottle housing, the bottom end of the bottle housing is essentially flat. The air valve functions as a one-way valve which permits air that is under ambient standard pressure to be received inside the bottle based on the removal of liquid by the infant through the nipple as the contents are being emptied by the baby. The slotted opening in the valve is strategically sized to permit the inflow of air, while at the same time the surface cohesion on the valve flat walls will not allow leakage of milk or other contents from the bottle through the valve slot.

It is, therefore, an object of the present invention to provide a baby bottle with a one-way valve for improved dispensing and outflow of the contents, which will prevent the nipple from collapsing and reduce the chance of the infant developing colic due to excess air intake.

Another object of the invention is to provide a simple valve mechanism which will permit ambient air to enter the bottom of the baby bottle and prevent the contents of the bottle from leaking through the air intake valve.

Still another object of the invention is to insure that the valve seat or valve housing will not be struck if the bottle falls or is dropped.

A further object of the invention is to provide a removable air pressure equalization valve to facilitate cleaning of the bottle and valve.

Yet another object of the invention is to simplify bottle assembly by providing interchangeability between the bottle end containing the nipple and the bottle end containing the valve.

PREFERRED EMBODIMENT OF THE INVENTION

Figure 1:
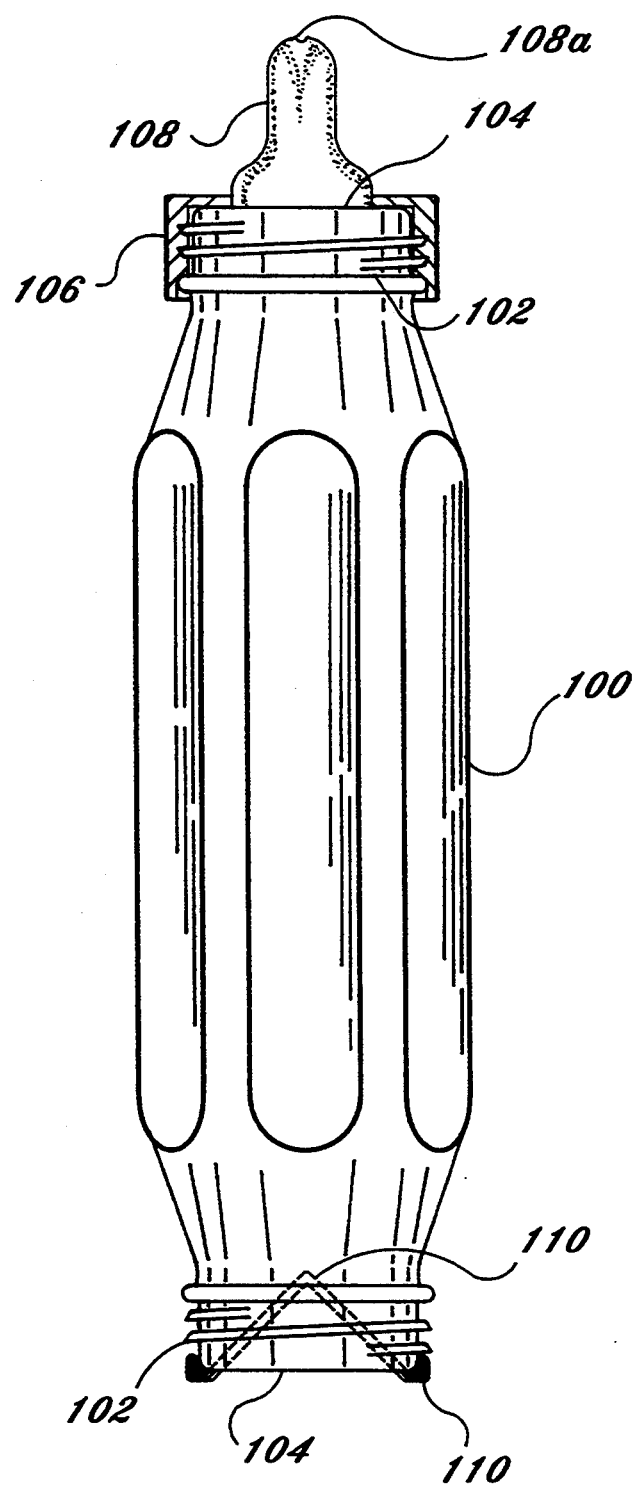
FIG. 1 is a side elevational view of the bottle housing and nipple, with the air valve shown in phantom.

Referring now to the drawings, and in particular FIG. 1, a clear plastic bottle housing 100 having two identically threaded annular ends 102 is shown, each end having an outer edge 104 defining a circular opening. In essence, the bottle housing 100 is hollow, rigid, and somewhat tubular with open, identically threaded ends. The threaded end portions 102 allow manual connection of a conventional plastic fixture or fastener 106 (shown in phantom in FIG. 1) to each end to sealably fasten the nipple 108 at one end and one-way air valve at the other end to the bottle housing. A nipple 108 removably attached by a screw-on fastener (fixture) 106 (phantom) is connected to one end of the bottle housing 100 in a conventional manner to one of the threaded annular ends 102 and covering the end opening 104a. A one-way air valve 110 (phantom) is connected by a screw-on fastener (not shown) similar to fastener 106 to the opposite end of the bottle housing. The air valve 110 is described in detail below. The size of the nipple opening 108a (FIG. 1) is important to the operation of the disclosed invention and is conventional in size. The nipple 108 works in conjunction with the valve 110 to prevent leakage of the bottle contents (milk, formula, or the like). Nipple opening 108a is sized for optimum fluidic transfer of materials from within the bottle while minimizing leakage, as is well known in the art.

Figure 2:
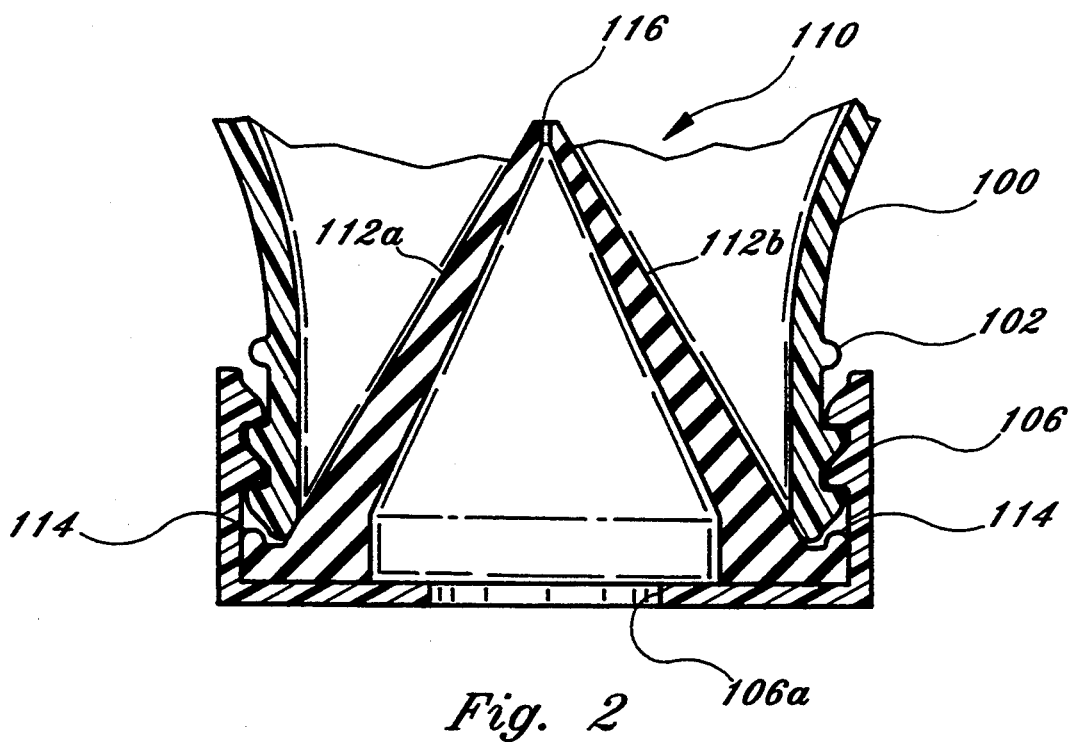
FIG. 2 is an elevational cross-sectional view of the improved air valve according to the invention, shown mounted in a fastener screwed to one end of the bottle, partially shown.
Figure 3:
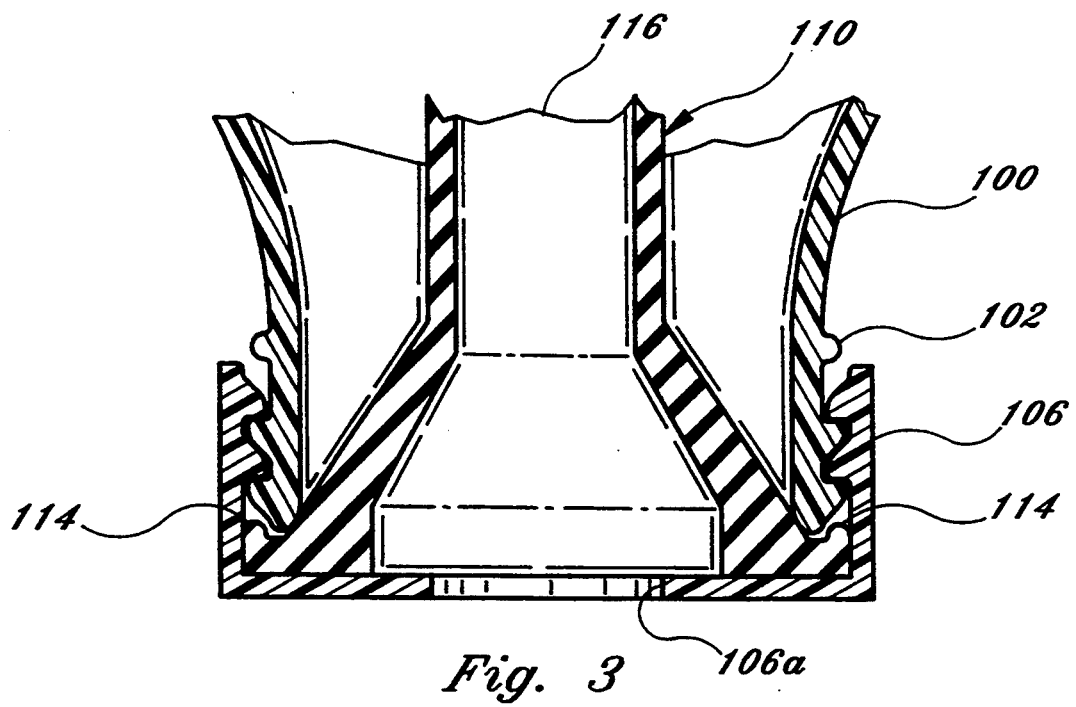
FIG. 3 is an elevational cross-sectional view of the improved air valve according to the invention, shown rotated 90° from the view in FIG. 2 and mounted in a fixture screwed to one end of the bottle.
Figure 4:
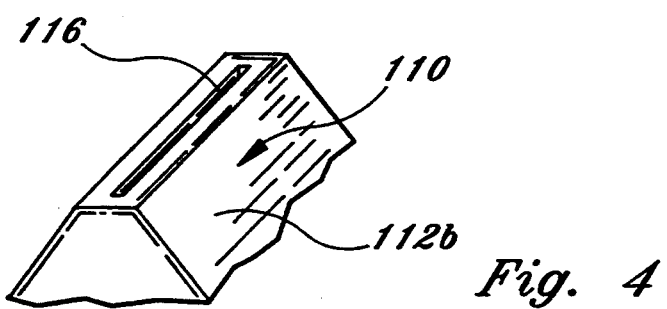
FIG. 4 is a perspective cutaway view of the top exterior of the improved valve.

Referring to FIGS. 2-4, the one-way air valve 110 admits air into the bottle housing 100 whenever the pressure in the bottle housing is below (less than) ambient air pressure.

A significant portion of the structural body of valve 110 extends concavely into an interior portion of bottle housing 100 so that the likelihood of damaging the body of valve 110 as a result of dropping bottle housing 100 is reduced and the likelihood of a small child biting the valve 110 is minimized. The threaded fasteners 106 that fasten the nipple 108 and the air valve 110 to the bottle housing 100 are easily removable manually in order to facilitate cleaning of bottle housing 100, the nipple 108, and the valve 110 after each use.

Valve 110 is connected to the bottle end threaded portion 102 by annular threaded fixture 106.

Valve 110 has a body fabricated from flexible or synthetic rubber, preferably latex, having a centrally disposed interior region defined by a pair of opposed, substantially flat, converging side walls 112a and 112b and a base sealing annular ring 114 which forms the base, integrally constructed with walls 112a and 112b. Side walls 112a and 112b are preferably constructed of a semi-rigid material, such as, for example, rubber or plastic, and are formed such that a pressure actuated air inlet or expandable passage 116 is developed along the juncture where flat surface areas of the side walls 112a and 112b meet almost flush at the apex of the valve body except for the slit thickness. The inside flat side walls (at least 0.005 inches in height) forming the apex passage are almost flush against each other, defined by the cross-section of the narrow slit 116 between them of a predetermined size, the optimum of which is 0.014 inches across. The valve body cross-sectional length may be one-half inch with the slit 116 length equal to three-eighths inch. This valve 110 prevents leakage of the bottle contents due to internal pressure on the valve wall. A sealing ring 114 is formed around the annular periphery of the valve base for engagement around the bottle housing end 104 by fasteners 106.

Air at ambient pressure can pass through opening 116 whenever pressure drops inside the bottle housing to offset demand by the baby. The valve 110 can function only to allow transfer whenever the pressure inside is lower than outside pressure. When the pressure is equal, the valve walls are almost flush at the apex of the valve body except for the slit thickness, wherein the slit depth, side wall interaction, and liquid cohesion prevent the liquid from escaping through air passage 116, thereby effectively sealing the passage 116.

FIG. 4 shows the apex of the valve 110, valve wall 112b, and the slit 116 formed by the valve walls.

In operation, the air valve 110 is mounted across one end of the bottle by a screw-on fastener 106, the bottle housing is filled with liquid, and the nipple is connected to the opposite end of the bottle. Initially, air valve passage 116 assumes an almost closed position as the result of walls 112a and 112b being urged into contact by the resiliency of the material and the fluidic pressure of the liquid or fluid thereon. The slit depth, side walls interaction, and liquid cohesion prevent the liquid from escaping through air passage 116. When an infant begins sucking on the nipple, the air pressure within the interior of bottle housing 100 decreases, creating a lower than ambient pressure. As a result, the air passage 116 permits air to be drawn into the bottle housing, thereby equalizing the pressure within the bottle housing.

In summary, the invention continuously adjusts the air pressure inside the bottle, preventing colic in the baby.

While one embodiment of the invention has been described, it will be understood that it is capable of further modifications and this application is intended to cover any variations, uses or adaptations of the invention, following in general the principles of the invention and including such departures from the present disclosure as to come within knowledge or customary practice in the art to which the invention pertains and as may be applied to the essential features hereinbefore set forth and falling within the scope of the invention or the limits of the appended claims.

What I claim is:

1. A one-way flexible air valve for use with a baby bottle having a contents within the bottle for feeding a baby to prevent colic by regulating air pressure within the bottle in conjunction with the contents of the baby bottle, the baby bottle having a periphery at a first open end, comprising:

a flexible one-way air valve body made of a resilient material and having an external periphery, said body including a first portion having a first flat side wall and a second flat side wall which converge to form a passage along an apex portion formed by said first flat side wall and said second flat side wall, each of said side walls having a converging wall thickness in the direction of said passage, said side walls forming an internal generally triangular chamber in cross-section, a portion of said first and second side walls being separated at all times by a distance throughout their respective lengths such that said side walls are almost flush at the apex of the valve body, the distance between the first and second side walls at the apex portion being no greater than 0.014 inches, wherein the passage depth, side wall interaction, and liquid cohesion prevent the liquid from escaping through the passage, said body including a base portion being annular around its periphery, said annular base portion having a circular portion that is hollow and in fluid communication with the passage formed between the first and second side walls that are converging, said side walls operatively associated with said annular base, said annular base sized to fit around the periphery of the first open end in the baby bottle, said open end having an outside edge, said one-way valve permitting air flow into the contents of the baby bottle, while preventing liquid contents from exiting said one-way valve to prevent spillage, said first portion and said base portion removably attached to each other.

2. A one-way valve as in claim 1, wherein said resilient material is made of a synthetic rubber.

3. A one-way valve as in claim 1, wherein said one-way valve is made of synthetic plastic.

4. A one-way valve as in claim 1, wherein a portion of said annular base is operatively associated with the outside edge of the open end of the baby bottle to form a seal around the outside edge of the open end of the baby bottle opening.

5. A one-way air valve for use in conjunction with a baby botle having first and second threaded open ends, with one of said ends for receiving a conventional nipple and the opposite end for receiving said one-way air valve in accordance with the present invention, comprising:

a tubular bottle housing having a first threaded annular end and a second threaded annular end, said one-way valve being mounted concavely inside one end of said bottle housing, said valve having a body with an elongated rectangular slit for admitting air, said body including a first portion having a first flat wall and a second flat wall which converge to form said elongated rectangular slit on an apex portion formed by said first flat wall and said second flat wall, said converging walls forming a generally triangular chamber in cross-section, each of said flat walls having a converging wall thickness in the direction of said apex portion, a portion of said first and second flat walls being separated at all times by a distance throughout their respective lengths such that said flat walls are almost flush at the apex of the valve body, the distance between the first and second side walls at the apex portion being no greater than 0.014 inches, wherein the slit depth, flat wall interaction, and liquid cohesion prevent the liquid from escaping through the slit; and annular means with threads for attaching said one-way valve manually to said baby bottle open end housing, said valve and said annular means removably attached to each other.

6. A one-way air valve for use with a baby bottle housing having two open ends, one of which receives a conventional nipple, and the other which receives said one-way air valve, said one-way air valve comprising:

an integrally formed one way air valve body having a concave interior portion formed by a pair of converging walls, said converging walls having end surfaces and an elongated narrow slit formed between the end surfaces of said converging walls, each of said converging walls having a converging wall thickness in the direction of said end surfaces, said converging walls forming a generally triangular chamber in cross-section, a portion of said converging walls being separated at all times by a distance throughout their respective lengths such that said converging walls are almost flush at an apex of the valve body, the distance between the converging walls at the apex porton being no greater than 0.014 inches, wherein the slit depth, converging wall interaction, and liquid cohesion prevent the liquid from escaping through the slit; and a base means annular in shape for attachment to the open end of said baby bottle, said base means comprising an annular threaded fixture, whereby air is permitted to flow inside said bottle thorugh a concave passage into the bottle when ambient pressure outside of the bottle is greater than air pressure inside the bottle, said base means and said concave interior portion removably attached to each other.

* * * * *